Jan. 13, 1970  B. BLOOM ET AL  3,488,777
UNIFORM CAP
Filed March 20, 1968
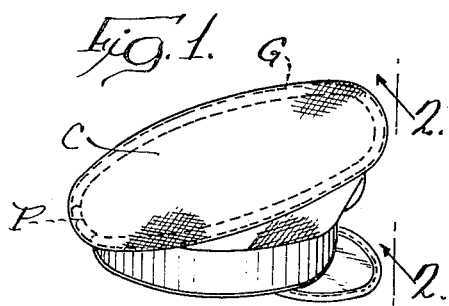
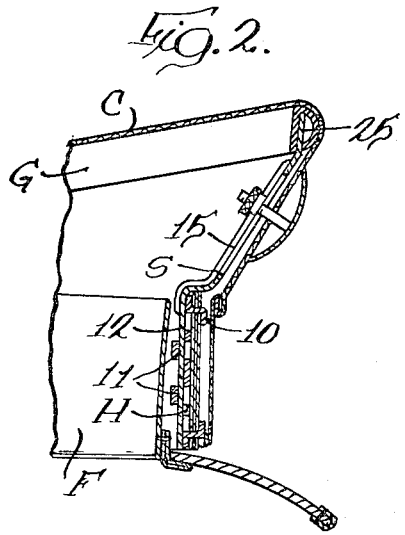
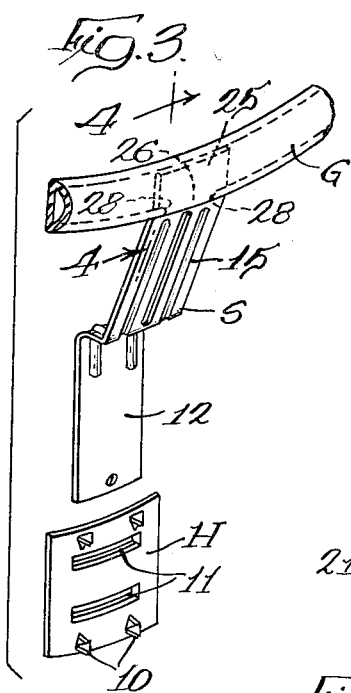
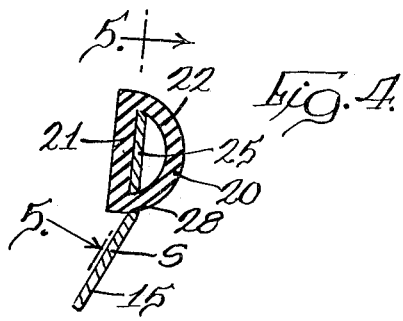
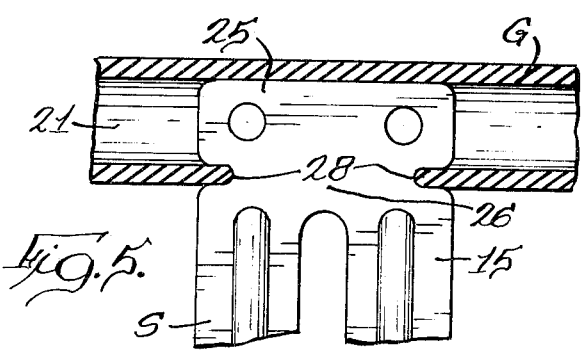
Inventors:
Bernard Bloom
Benjamin Lev
By Hofgren, Wegner,
Allen, Stellman & McCord
Attys United States Patent Office 3,488,777
Patented Jan. 13, 1970

3,488,777
UNIFORM CAP
Bernard Bloom, Chicago, and Benjamin Lev, Skokie, Ill., assignors to Midway Cap Company, a corporation of Illinois
Filed Mar. 20, 1968, Ser. No. 714,574
Int. Cl. A42b 1/02
U.S. Cl. 2—195        7 Claims

ABSTRACT OF THE DISCLOSURE

A uniform cap having a frame over which is fitted a flexible cover with a hollow tubular grommet within the cover for distension thereof. A stay upstanding from the frame has a head portion insertable through an opening in the grommet and shaped for retention within the hollow tubular portion for attaching the grommet to the frame.

---

This invention relates to a uniform cap having a frame and attached grommet for distending a flexible cover, and more particularly to improve means for attaching an upstanding supporting stay to the grommet.

Various means have been devised for attaching a distending band or grommet to a stay upstanding from the frame of a uniform cap. The grommet typically is tubular in cross-section and made from rubber-like material that is both flexible and resilient. The ends of the grommet may be coupled together to produce an endless band by a short plug whose opposite end portions are fitted snuggly within the hollow proximate end portions of the grommet. Such an endless grommet is supported at the front of the cap by an upstanding stay which is connected by suitable means to the grommet.

One such connection means has taken the form of fingers which extend from the stay and are bent around and clinched upon the grommet, such as shown in U.S. Patent 2,575,114 to H. Lev. Such fingers or prongs have a disadvantage in that it is difficult to close the prongs with equal force and thus insure even finish at the top. When one of the prongs does not completely close, it will rub against the inside of the flexible cover, causing it to wear unnecessarily and resulting in an unsuitable appearance. Other connection means have included a button-like section on the short plug for closing the grommet, which is snapped through an opening in the upstanding stay, such as shown in U.S. Patent 2,536,134 to H. Lev. Such construction has a similar disadvantage in that a portion of the upstanding stay may extend beyond the resilient button, causing the cap to unnecessarily wear. Furthermore, such buttons are difficult to insert through the opening in the grommet, and require specially shaped plugs and the like which are expensive to manufacture.

In accordance with the present invention, an improved means of attaching the upstanding stay of a uniform cap to the grommet therefor is disclosed. The improved means prevents the metal stay from rubbing against the flexible cover of the uniform cap, by retaining the head portion of the stay entirely within the hollow tubular grommet. As a result, the grommet itself is the only part in contact with the flexible cover, and since it is smooth and even throughout its length, unnecessary wear is eliminated and the appearance is constantly favorable. In addition, the grommet may be readily removed from the stay and replaced by a new grommet, without weakening the connection means by repeated replacement of the grommet. Furthermore, the grommet when attached to the stay is constantly held in a fixed position, and accidental separation is virtually impossible.

One object of this invention is the provision of an improved means for attaching an upstanding stay to a distension band for a uniform cap.

One feature of this invention is the provision of a uniform cap having a stay with a head portion which is received entirely within a grommet for distending a flexible cover, preventing the stay from coming in contact with the flexible cover.

Another feature of this invention is the provision of a uniform cap having a stay upstanding from the frame at the cap front and including a portion insertable through an opening in a hollow tubular grommet and shaped for retention within the tubular portion. The head of the stay is shaped to lie against a wall of the grommet to retain the grommet in a fixed position.

Further features and advantages of the invention will be apparent from the following description and from the drawings, in which:

FIG. 1 is a perspective view of a uniform cap of the general type to which the invention applies;

FIG. 2 is a fragmentary central vertical section through the front portion of the cap, and taken along lines 2—2 of FIG. 1;

FIG. 3 is a fragmentary perspective view, looking from the front, showing the grommet, the supporting stay, and the holder therefor;

FIG. 4 is a cross-sectional view of the grommet, taken along lines 4—4 of FIG. 3, and showing the supporting stay retained therein; and FIG. 5 is a fragmentary front view take along lines 5—5 of FIG. 4, and showing the grommet and supporting stay retained therein.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

The illustrated cap has a conventional endless frame F made of fiber, plastic or the like. This frame, which optionally may be fabric covered, furnishes on its inner face a mounting for a holder H in the form of a plate which may be transversely bowed and from which tines 10 are struck outwardly to traverse the frame for clinching upon its outer face, as illustrated in FIG. 2. In some such way as this, the holder is secured fixedly to the frame.

A pair of endwise-bowed bars 11 is also struck out to lie spaced from the holder plate and to which they remain connected at their opposite ends. These bars, which are disposed inwardly of the holder, as seen in FIG. 2, furnish a mounting for the bowed lower end 12 of a stay S in the form of a strap which may be slidably fitted to the inside of the bars against the inner face of the plate to extend upwardly of the frame. A stay-holder assembly of this kind is suggested as appropriate in connection with the present invention. The stay and its upper end region 15 are inclined forwardly in accordance with usual practice.

There is also provided a grommet G which fits within the cap cover C for distension thereof. This grommet which is made from a suitable rubber-like material is both flexible and resilient, and preferably has a surrounding wall 20 which defines a hollow tubular cross-section which is unsymmetrical in shape. Wall 20 includes a straight wall section 21 which connects with a curved wall section 22 bowed therefrom in the form of a D-shape or half-round.

The two ends of the grommet are releasably connected together so as to provide an endless band, and for this purpose, a plug P an inch or two long has opposite end portions inserted into the hollow ends of the grommet G for frictional engagement therewith. The plug ends may be secured fixedly to the grommet, as by cement, so as to remain permanently connected thereto. Desirably, the plug P is of the same material and internal cross-section as is the tubular grommet itself so as to provide therefor a solid core throughout the region of the coupling.

The grommet G is connected to the stay S at its upper end 15 so as to receive support at a fixed elevation. More particularly, the upper end 15 of the stay S is formed into a head portion 25 connected to the remaining portion of the stay S through a neck portion 26 of reduced transverse dimensions, as seen in FIG. 5. Grommet G has a slit-like opening 28 through the wall 20 where the straight wall section 21 meets the curved wall section 22 internally within the grommet. The width of the slit opening 28 is made approximately equal to the width of the neck portion 26 of stay S. When the stay is inserted within the grommet G, the resilient grommet is manually stretched so as to lengthen the slit opening 28 and allow the enlarged head portion 25 to pass therethrough into the hollow tubular portion thereof. The grommet may then be released so as to cause the wall 20 surrounding the slit to contract and rest against the neck portion 26 of the grommet, thus retaining the enlarged head portion 25 entirely within the hollow tubular grommet.

Preferably, the head portion 25 has the same shape and length as either the internal wall section 21 or 22 of wall 20, so as to lie continuously thereagainst and form a support therefor. As illustrated, the head portion 25 may be of flat cross section, FIG. 4, in order to lie flat against the total height of wall section 21. This prevents the grommet G from twisting or turning relative to stay S, and thus retains the grommet in the desired position relative to the cap C. Furthermore, it will be apparent that the stay S is prevented from coming in contact with the flexible cap cover, thus preventing unnecessary wear thereof.

We claim:

1. For use with a uniform cap having a frame whereon may be fitted a flexible cover, an assembly, comprising:
a tubular resilient grommet for reception within the cover for distension thereof, said tubular resilient grommet having an elongated opening through the bottom thereof for access to the tubular resilient grommet, and an elongated rigid stay, said elongated rigid stay having an upper portion of greater extent than said elongated opening, said upper portion being inserted therethrough and engaged within said tubular resilient grommet, said upper portion having means engaging an inner surface of said tubular resilient grommet for retaining said elongated rigid stay thereto.

2. The assembly of claim 1 wherein said engaging means of said upper portion of said stay includes a head for retention within the tubular resilient grommet and a neck of reduced extent with respect to the head, said neck portion being retained within the elongated opening in the grommet.

3. The assembly of claim 2 wherein said grommet is of a flexible, resilient material and said elongated opening is of reduced extent with respect to the head of said stay, said grommet being stretched to allow the head to pass through the elongated opening in the wall of the grommet for insertion into the tubular resilient grommet, whereby said grommet contracts around said neck when released from a stretched position.

4. The assembly of claim 1 wherein said grommet has plural wall surface sections of different shape, and said upper portion of said stay includes a surface similarly shaped to one of said wall sections for contact substantially over the whole wall surface section in order to retain the grommet fixedly with respect to the stay.

5. The assembly of claim 4 wherein said plural wall surface sections have a generally D-shaped cross-section with one wall section forming a flat portion of the D-shape and the other wall section forming a curved portion of the D-shape, and said surface similarly shaped of said stay is a flat surface for retention against substantially the whole flat portion of said one wall section.

6. The assembly of claim 5 wherein said curved wall section of said grommet includes said elongated opening therein near said flat wall section, said upper portion of said stay being inserted through said elongated opening and extending against the flat portion of said D-shaped wall.

7. The assembly of claim 1 wherein said upper portion of said stay abuts against a wall of the grommet to form a supporting surface therefor.

References Cited

UNITED STATES PATENTS 2,536,134   1/1951   Lev _____ 2—195

PATRICK D. LAWSON, Primary Examiner

G. H. KRIZMANICH, Assistant Examiner